United States Patent [19]
Roberts

[11] Patent Number: 5,102,938
[45] Date of Patent: Apr. 7, 1992

[54] POLYURETHANE PREPOLYMER COMPOSITION COMPRISING A WATER-IMMISCIBLE SOLVENT

[75] Inventor: Gary P. Roberts, Forest Lake, Minn.

[73] Assignee: Minnesota Mining and Manufacturing Company, St. Paul, Minn.

[21] Appl. No.: 533,496

[22] Filed: Jun. 5, 1990

[51] Int. Cl.$^5$ .............................................. C08G 18/83
[52] U.S. Cl. .................................... 524/287; 524/303;
524/306; 524/315; 524/354; 524/361; 524/590;
524/916; 528/76; 52/744
[58] Field of Search ............... 524/287, 303, 306, 315,
524/354, 361, 590, 916; 528/76; 52/744

[56] References Cited

U.S. PATENT DOCUMENTS

| | | | |
|---|---|---|---|
| 3,719,050 | 3/1973 | Asao et al. | 61/36 R |
| 3,894,131 | 7/1975 | Speech | 264/45.2 |
| 3,985,688 | 10/1976 | Speech | 260/2.5 AP |
| 4,315,703 | 2/1982 | Gasper | 405/264 |
| 4,383,079 | 5/1983 | Gasper et al. | 524/767 |
| 4,749,592 | 6/1988 | Gasper et al. | 427/140 |
| 5,037,879 | 8/1991 | Roberts | 524/317 |

FOREIGN PATENT DOCUMENTS 1035521 8/1978 Canada .

Primary Examiner—Maurice J. Welsh
Assistant Examiner—Rachel Johnson
Attorney, Agent, or Firm—Gary L. Griswold; Walter N. Kirn; Dale A. Bjorkman

[57] ABSTRACT

A hydrophilic polyurethane prepolymer in a compatible, water-immiscible solvent or water-immiscible solvent blend having a solids content of greater than about 10 and less than about 50 percent prepolymer in the solvent or solvent blend. This composition reacts with water at about a 1:1 ratio by volume to produce an excellent gel for use in sealing water containing structures and soil stabilization. In the cure process, the compositions of the present invention expand less than 50%, and preferably less than 30%.

12 Claims, 4 Drawing Sheets

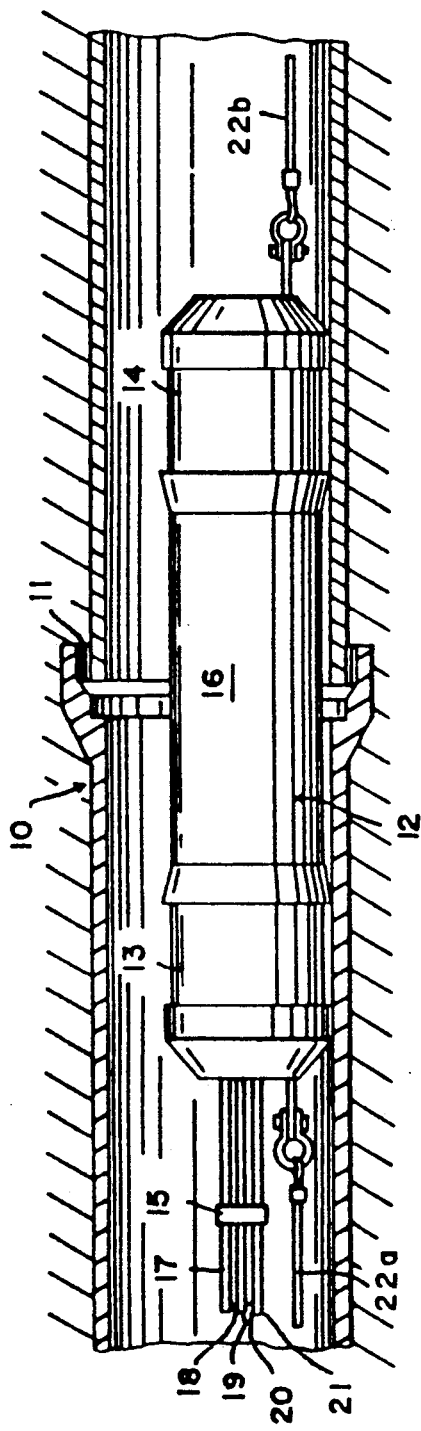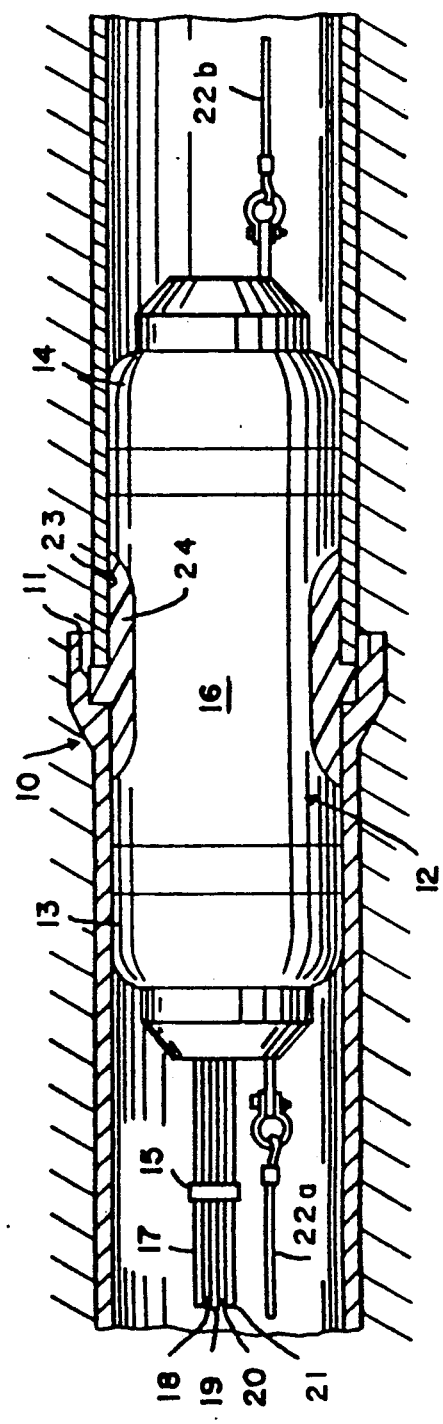

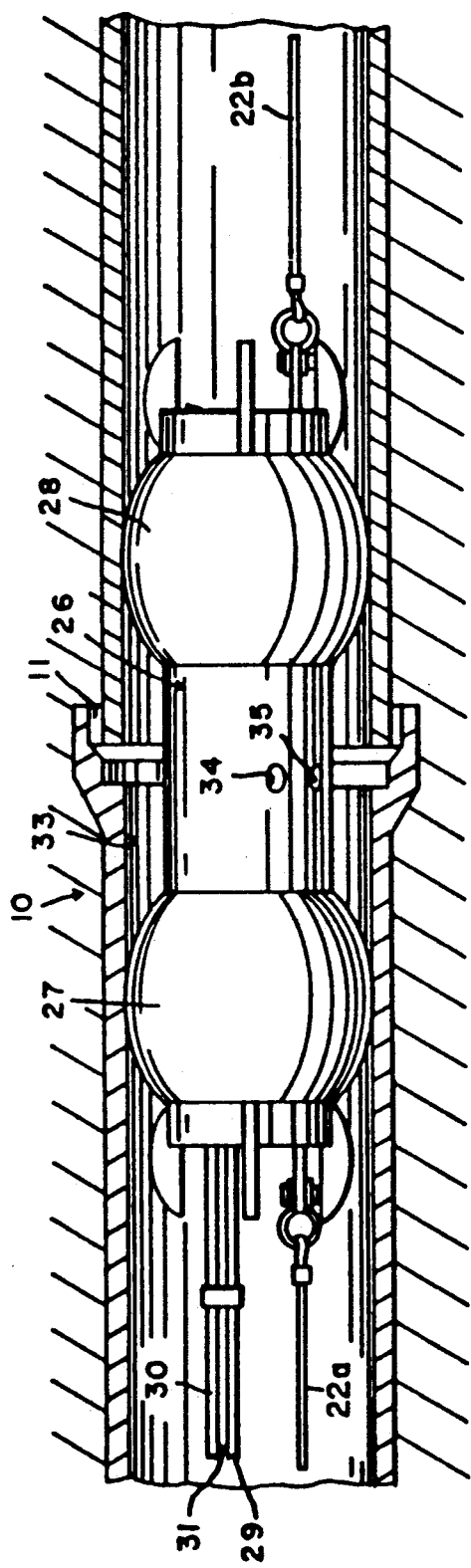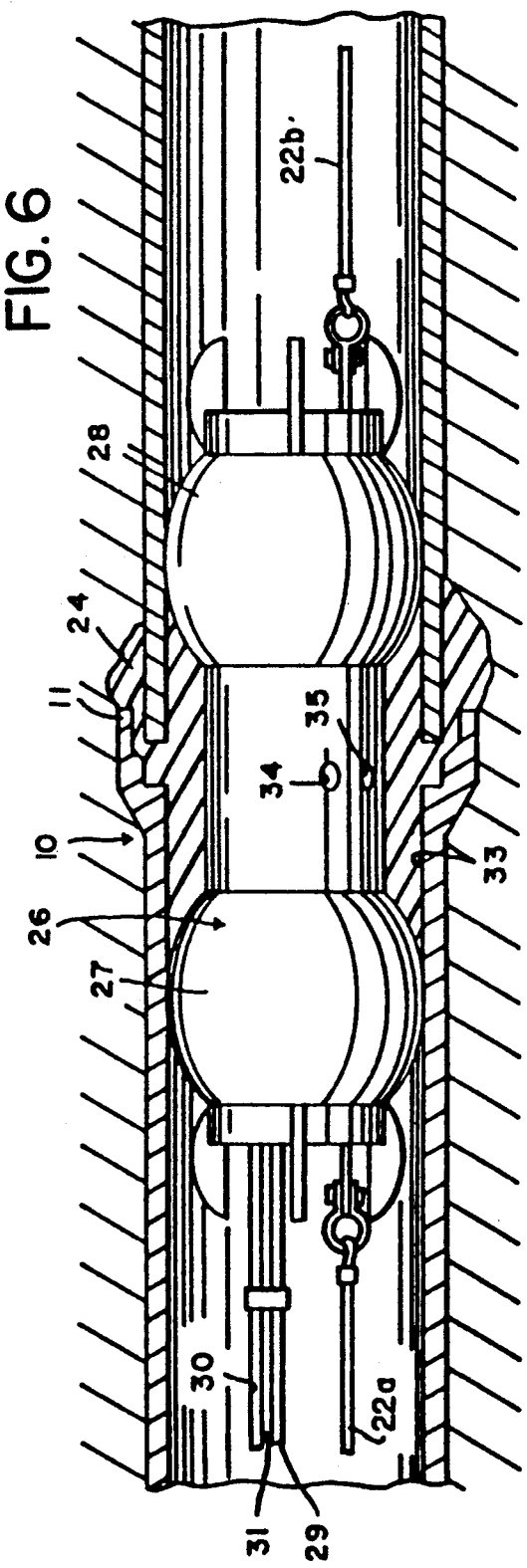

POLYURETHANE PREPOLYMER COMPOSITION COMPRISING A WATER-IMMISCIBLE SOLVENT

FIELD OF THE INVENTION

This invention relates to polyurethane prepolymer compositions useful to prepare grout for sealing water containing structures.

BACKGROUND

Various polyurethane prepolymer compositions have long been used for soil consolidation and as grouts for sealing structures. U.S. Pat. No. 3,985,688 to Speech is directed to a foam polyurethane grout that is typically pumped into a sewer line by using a sewer packer device that is pulled through the sewer with cables. The sewer packer is stopped at each joint and inflated to form a seal on opposite sides of the joint. The grout is injected at the middle portion of the packer to seal the joint and, after cure of the grout, the packer is deflated and pulled to the next joint. Foam grouts are usually difficult to utilize in this type of packer, because the foam expands in volume more than about 100% during reaction of the prepolymer with water. This amount of expansion can cause the foam to back up excessively into the packer and trap it in the sewer line.

Other polyurethane prepolymer compositions, such as disclosed in U.S. Pat. No. 3,719,050 to Asao et. al, are gels and do not expand in volume more than about 50% during the reaction of the prepolymer with water. The Asao composition suffers from the disadvantage that in order to provide a good gel as desired, the prepolymer is reacted with water at an eight or nine parts water to one part prepolymer ratio. This ratio of reactants necessitates the use of specialized pumping equipment to apply this particular grout product.

The prior grout compositions discussed above were all provided as a prepolymer solution in water-miscible solvents, apparently because it was believed that water immiscible solvents would not mix well with water in the reaction step and would result in poor grouts.

A chemical soil consolidation composition utilizing a water immiscible solvent is "Scotch-Seal 5620" Chemical Grout, commercially available from 3M Company, St. Paul, MN. This composition has a high initial viscosity (about 6,000 centipoise), but has a low viscosity when mixed with water at about a 10:1 to 20:1 water/composition ratio to allow good soil penetration. Because of the high initial viscosity, this composition is not easily pumpable through standard grout pumping equipment and thus cannot be used as a sewer grout. This composition is an 80% polyurethane prepolymer in butyl benzyl phthalate.

An alternative composition employed as a sewer sealing composition is based on acrylamide, which is typically provided as a liquid pumped in a 1:1 ratio with water into the site of the leak and into the surrounding soil to form a cured gel which inhibits or prevents leaking. Much of the sewer sealing equipment employed in the United States and other countries has been designed to utilize acrylamide or acrylate type sealing compositions, that are pumped in a 1:1 ratio with water for cure.

SUMMARY OF THE PRESENT INVENTION

It has surprisingly been discovered that polyurethane prepolymer compositions using water-immiscible organic solvents or water-immiscible organic solvent blends at a solids content of greater than about 10 percent and less than about 50 percent prepolymer in the solvent or solvent blend provide excellent grouts when mixed at about a one-to-one ratio with water. These polyurethane prepolymer compositions gel quickly and potentially can be supplied at a lower cost than polyurethane prepolymers in water-miscible solvents. When the water-immiscible solvent or solvent blend has low volatility, the polyurethane prepolymer composition possesses additional advantages, including reduced safety concerns during application of the grout and reduced shrinkage of the grout after cure.

The compositions of the present invention comprise a water-immiscible organic solvent or solvent blend, and a water-soluble polyurethane polymer having terminal isocyanate groups. The polyurethane prepolymer is formed by reacting a polyether compound with an organic polyisocyanate. The polyether compound has at least two terminal active hydrogen groups and a number average molecular weight between about 3,000 and 20,000 and having random ethylene oxide units and higher alkylene oxide units in a mole ratio of ethylene oxide units to higher alkylene oxide units of at least about 1:1. The higher alkylene oxide units comprise three or more carbon atoms, and preferably are selected from the group consisting of propylene oxide, butylene oxide, pentylene oxide, hexylene oxide, and mixtures thereof. The polyether compound is reacted with sufficient organic polyisocyanate compound having at least two terminal isocyanate groups to provide a NCO:OH ratio of about 5:1 to about 1.05 to 1.0.

In the cure process, the compositions of the present invention will expand less than 50%, and preferably less than 30%. A small amount of expansion, however, is desirable because it will provide a mechanical adhesion of the grout to the joint to be sealed.

DRAWINGS

Examples of known equipment suitable for practicing the method of this invention employing the composition of the present invention for sealing a joint in a concrete sewer line are illustrated in the accompanying drawings in which:

FIG. 1 is a view in elevation of a three element packer disposed in a sewer line (shown in cross-section) in the vicinity of a joint in the line;

FIG. 2 is a view of the packer of FIG. 1 expanded at its ends to isolate the joint and form a circular cavity at the locus of the joint which is filled with a gelled mass;

FIG. 5 is a view of the two element packer of FIG. 4 expanded at its ends to isolate the joint and form a circular cavity between the expanded packer surface and the inner sewer line surface;

FIG. 6 is a view of the two element packer of FIG. 4 wherein a gelled mass has filled the cavity described in FIG. 5.

Figure 3:
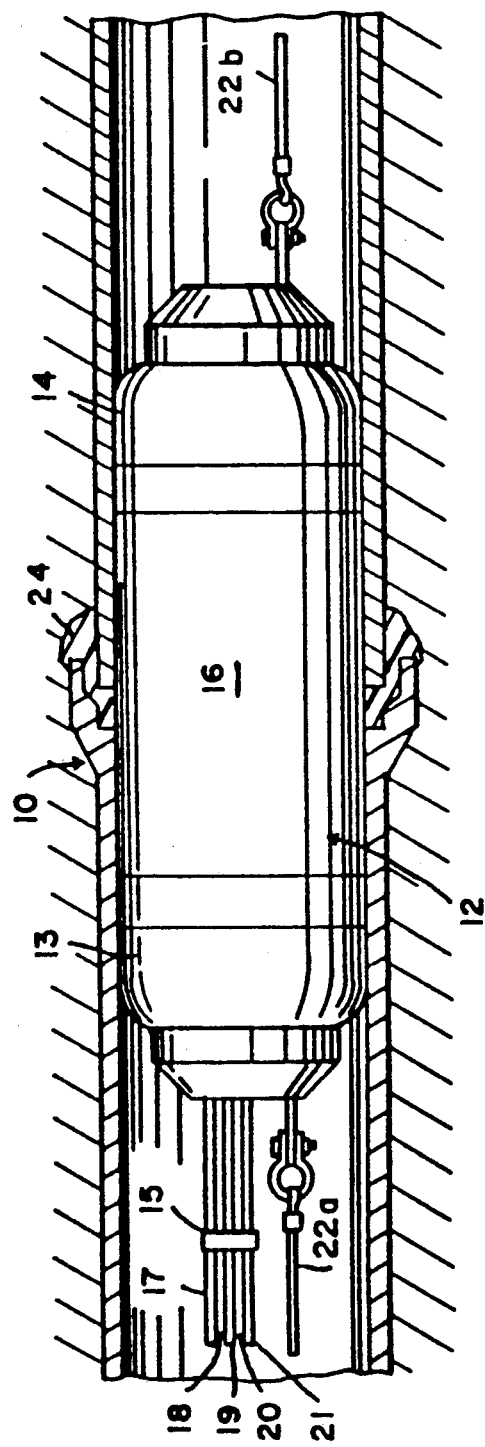
FIG. 3 is a view of the packer of FIG. 1 fully expanded to force the gelled mass from the cavity into the joint.

Referring to the accompanying drawing and initially to FIG. 1, reference number 10 denotes generally a sewer line having joint 11 through which the incursion of water into the sewer line is occurring or may occur. Disposed within the line 10 is packer 12 with three inflatable diaphragm sections 13, 14, 16 shown in FIG. 1 in their collapsed conditions, which can be inflated by means of air. The air used to inflate the packer diaphragm sections is delivered to the packer by means of hoses 17, 18 and 19, each hose serving to inflate one of the packer diaphragm sections. The prepolymer mixture of this invention is delivered to the packer via hose 20 and the water or a latex contained in sufficient water required for reaction of the prepolymer is delivered via hose 21, all of the hoses being held together by band 15. Packer 12 can be positioned by means of cables 22a and 22b attached to the packer and to an external means for moving the packer, e.g., winches.

In FIG. 2 the outer diaphragm sections 13 and 14 of packer 12 have been inflated, isolating joint 11 and forming a circular or annular cavity 23 at the locus of the joint. The sealing composition of this invention is injected in a controlled amount into cavity 23 together with water, for example, by spraying separate streams of these materials into the cavity in such a manner as to cause the two sprays to impinge, thus ensuring rapid admixture and reaction.

In a short time, e.g., 30 seconds after the injection, gel 24 begins to form in cavity 23 and center section 16 is inflated as shown in FIG. 3, forcing the still reacting gel into joint 11. After about 5–2000 seconds, gel 24 will have thickened to its maximum viscosity, forming a gelled mass which seals joint 11. Packer 12 can be deflated and moved by cables 22a and 22b to the next joint where the operation is repeated.

Figure 4:
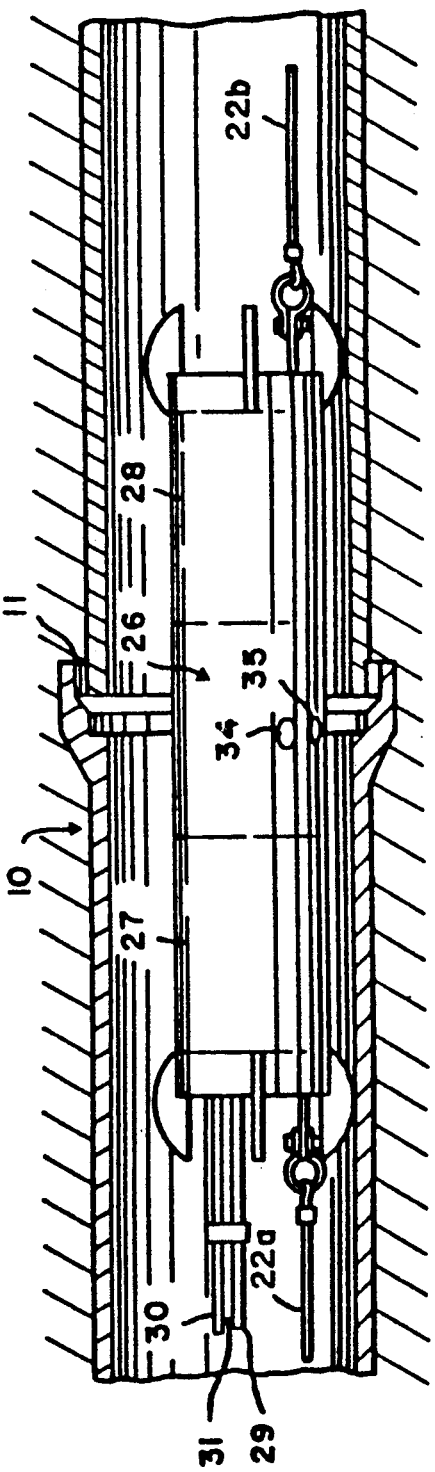
FIG. 4 is a view in elevation of a two element packer disposed in a sewer line (shown in cross-section) in the vicinity of a joint in the line.

Referring now to FIG. 4, sewer packer 26 is shown with two inflatable diaphragm sections 27 and 28 in their collapsed condition. Inflatable diaphragms 27 and 28 may be inflated by means of air delivered to packer 26 by means of air hose 31. The prepolymer mixture of this invention may be delivered by hose 30 and the water or latex and optional filler contained in sufficient water required for reaction of the prepolymer delivered via hose 29. Packer 26 may be positioned by means of cables 22a and 22b attached to the packer and to an external means for moving the packer, e.g., winches.

In FIG. 5, inflatable elements 27 and 28 of packer 26 have been inflated isolating joint 11 and forming circular or annular cavity 33 at the locus of the joint between the packer wall and the inner wall of the sewer line. A controlled amount of the sealing composition of this invention may be injected into cavity 33 with the water or latex and optional filler material. These ingredients are introduced by pressure controlled flow through separate packer orifices 34 and 35, one orifice for the prepolymer and one for the water or latex and optional filler components. When the streams commingle, a reaction occurs, forming the gell-forming sealing composition.

As shown in FIG. 6, gel 24 begins to form in cavity 33 and is forced into joint 11 and a minor amount of surrounding soil.

Figure 7:
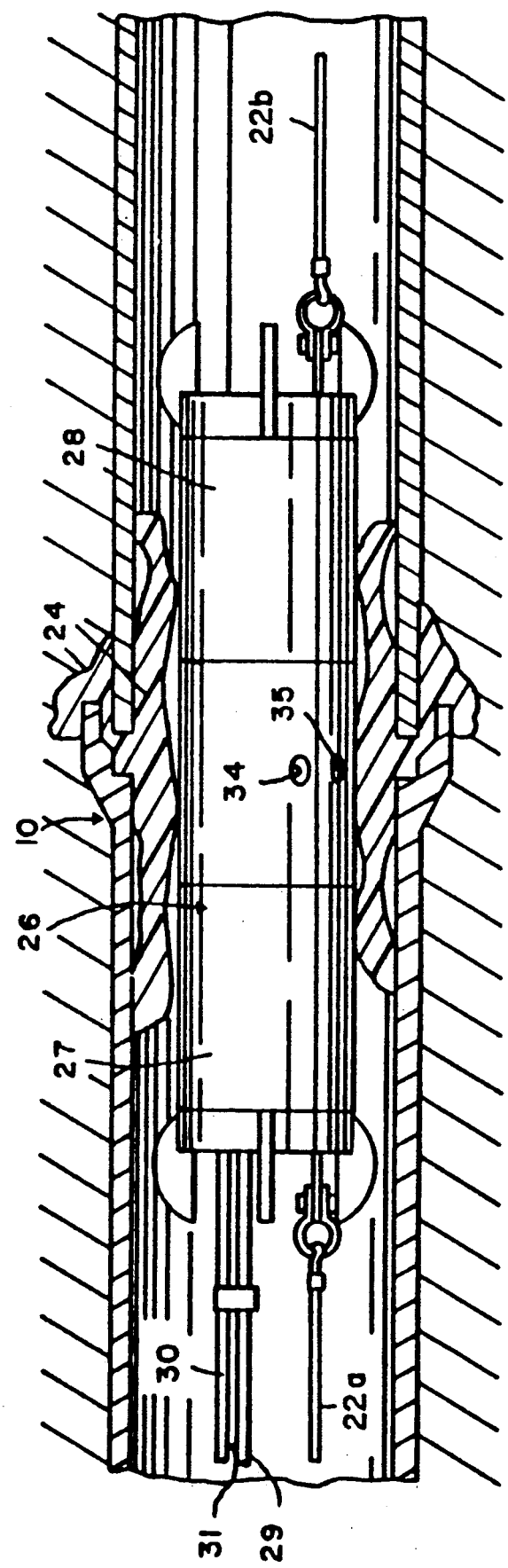
FIG. 7 is a view of the unexpanded packer of FIG. 4 after permitting the gelled material to flow into the joint area and into the surrounding soil.

FIG. 7 shows inflatable elements 27 and 28 deflated. After this deflation, packer 26 may be moved by means of cables 22a and 22b to the next joint and the operation repeated.

DESCRIPTION OF PRESENTLY PREFERRED EMBODIMENTS

Solvents to be used in the compositions of the present invention are water-immiscible and are compatible with the polyurethane prepolymer. By definition, a solvent is miscible with water if it is capable of being mixed in all proportions. Conversely, a water-immiscible solvent, such as that used in compositions of the present invention, is not capable of being mixed in all proportions. Preferably, the solvent selected will form a separate phase when mixed with water at less than a 1:10 solvent/water ratio. Most preferably, the water-immiscible solvent will form a separate phase when mixed with water at less than a 1:100 solvent/water ratio. Solvents that are compatible with the prepolymer contain no active hydrogen groups that will react with the prepolymer, such as hydroxyl groups or primary or secondary amines.

Unexpectedly, the prepolymer composition of the present invention mixes quite well with water. It appears that the more hydrophobic the water-immiscible solvent is, the easier the prepolymer mixes with water. Because the prepolymer of the present composition itself is water-miscible, the water that is introduced to prepare the ultimate grout will have greater affinity for the prepolymer than the solvent. In general, faster uniform mixing of the prepolymer composition with water results in a better grout. Instead of obtaining a clear or hazy solution when mixed with water, as is the case with water-miscible solvents, compositions comprising water-immiscible solvents become milky white on addition of water. This is indicative of a two phase system. After a brief mixing period, the water appears to become absorbed into the hydrophilic prepolymer phase. The viscosity of the various diluted prepolymers is approximately the same as the viscosity of similar compositions comprising water-miscible solvents, but gel times are shorter.

The use of water-immiscible solvents in the present grout compositions makes it possible to prepare low viscosity grouts that will react quickly with water to form a gel. This short gel time is useful where excellent soil penetration is not required or desired. The short gel time of the compositions of the present invention are particularly advantageous in applications where flowing water is present.

The use of water-immiscible solvents also provides a grout at a potentially lower cost than previously possible due to the larger group of solvents from which to choose. The solvents used in the present invention need only be compatible with the prepolymer, and do not also have to be water-miscible. Because additional solvents are available that were not previously considered, other considerations, such as the desire for higher flash points and other factors related to safety, can more easily be accommodated. Preferably, the solvents used in the present invention are non-polar or have relatively low polarity. Lower polarity solvents tend to provide the fastest cure rates. In order to minimize shrinkage of the grout after cure, the solvent selected preferably will have a negligible evaporation rate. The vapor pressure of such a solvent at 20° C. will preferably be less than about 10 mm Hg, and more preferably less than about 3 mm Hg. Low volatility solvents advantageously have less odor and hazardous vapor.

Specific examples of water-immiscible solvents that may be utilized in the present invention include water-immiscible esters, such as ethyl acetate, isopropyl acetate, n-propyl acetate, isobutyl acetate, n-butyl acetate, isobutyl isobutyrate, 2-ethylhexyl acetate, ethylene glycol diacetate, "Exxate 900" solvent (a C9 acetate commercially available from Exxon Corp., Houston, TX) and "Exxate 1000" solvent (a C10 acetate commercially available from Exxon Corp., Houston, TX); water-immiscible ketones such as methyl ethyl ketone, methyl isobutyl ketone, methyl isoamyl ketone, methyl n-amyl ketone, diisobutyl ketone, cyclohexanone and isophorone; water-immiscible aldehydes such as acetaldehyde, n-butyraldehyde, crotonaldehyde, 2-ethylhexaldehyde, isobutylaldehyde and propionaldehyde: water-immiscible ether esters such as ethyl 3-ethoxypropionate: water-immiscible aromatic hydrocarbons such as toluene, xylene and "AMSCO-SOLV G" solvent (an aromatic hydrocarbon solvent commercially available from Unocal Corp., Schaumberg, IL); water-immiscible halohydrocarbons such as 1,1,1 trichloroethane; water-immiscible glycol ether esters such as propylene glycol monomethyl ether acetate (commercially available as "Ektasolv ® PM Acetate" from Eastman Chemical Products, Inc., Kingsport, TN), ethylene glycol monoethyl ether acetate (commercially available as "EE Acetate" from Eastman Chemical Products, Inc., Kingsport, TN), ethylene glycol monobutyl ether acetate (commercially available as "Ektasolv ® EB Acetate" from Eastman Chemical Products, Inc., Kingsport, TN), diethylene glycol monobutyl ether acetate (commercially available as "Ektasolve ® DB Acetate" from Eastman Chemical Products, Inc., Kingsport, TN); water-immiscible phthalate plasticisers such as dibutyl phthalate, diethyl phthalate, dimethyl phthalate, dioctyl phthalate, dioctyl terephthalate, butyl octyl phthalate, butyl benzyl phthalate and alkyl benzyl phthalate commercially available as "Santicizer 261" from Monsanto Corp., St. Louis, MO; and other water-immiscible plasticisers such as dioctyl adipate, triethylene glycol di-2-ethylhexanoate, trioctyl trimellitate, glyceryl triacetate, glyceryl/tripropionin, 2,2,4-trimethyl-1,3-pentanediol diisobutyrate, HB-40 solvent (a partially hydrogenated terphenyl plasticiser commercially available from Monsanto Corp., St. Louis, MO) and "Mesamoll" solvent (an alkylsulfonic acid ester of phenol commercially available from Mobay Chemical Co., Pittsburgh, PA).

A 1:1 water to prepolymer composition reaction ratio is employed in the application of the compositions of the present invention because a large percentage of the grouting equipment in the industry is capable of pumping only at that ratio. It will be understood that at least a 10% pumping variation in observed pumping ratios of this equipment is normal.

The prepolymer composition of the present invention reacts with water at about a 1:1 ratio to form a gel, which is defined as a urethane hydrogel matrix that expands less than about 50%, and preferably less than about 30%, during gel formation. The amount of expansion is tested by forming the gel with known volumes of reactants in a beaker, allowing the gel to stand for at least 15 minutes after gelation, and then quickly measuring the volume of water displacement of the gel.

The solids content of the compositions of the present invention is greater than about 10 and less than about 50 percent of prepolymer in organic water-immiscible solvent. Compositions having a solids content that is lower than 10 percent tend to be too soft and lack tensile integrity for most sealing applications, and also have a longer gel time. A prepolymer composition having a solids content at the lower end of the indicated scale is more sensitive to excessive amounts of water at the application site, which may result in a weaker grout. Compositions having a solids content of greater than about 50 percent result in foams, rather than gels, when mixed with water at the desired 1:1 ratio. Preferably, the solids content is between about 20 and 40 percent. This range of solids content provides strong gels that are more forgiving of slight variations in water reaction ratios that can occur on the job site. Because the compositions of the present invention have lower prepolymer content than conventional polyurethane grout compositions, they also advantageously exhibit lower viscosity than polyurethane grout compositions that are presently commercially available. This lower viscosity enhances the compatibility of the compositions with existing grout application equipment because it is more easily pumped.

The preparation of isocyanate-terminated prepolymers, such as those used in the sealing composition of this invention, and the reaction thereof with water to form a polyurea, is disclosed in the art, e.g., U.S. Pat. Nos. 2,726,219, 2,948,691, 3,719,050, 3,985,688 and Canadian Pat. No. 1,035,521 and "Polyurethanes: Chemistry and Technology" by Saunders and Frisch, Part I, Interscience Pub., N.Y. (1962).

The urethane prepolymers used in this invention can be prepared by reacting an aliphatic or aromatic polyisocyanate with a polyether poly-active hydrogen compound using an NCO/active hydrogen equivalent ratio in the range of about 5:1 to about 1.05:1.

The terminal active hydrogen groups on the polyether poly-active hydrogen compound may be provided by polyols such as ethylene glycol, glycerin, trimethanolpropane, trimethanolethane, pentaerythritol, sorbitol, sucrose, and methylglucoside. The active hydrogens may also be provided by amines such as ethylenediamine, ethylenetriamine, and methylamine. An example of an amine terminated polyoxyalkalene compound are the Jeffamine ® commercially available from Texaco Chemical Co., Belair, Texas. Other active hydrogen containing compounds include castor oil, tall oil, carboxylic acids such as rosin, and compounds having at least two hydroxyl groups obtained by the reaction of aldehydes with other compounds (for example, olefins, aromatic hydrocarbons, and the like).

To insure water-miscibility, the polyether poly-active hydrogen compound will have a polymeric backbone that comprises at least about 50 percent ethylene oxide units. Generally the prepolymers will have a molecular weight range of about 3,000–20,000, preferably 5,000 to 10,000. Commercially available polyol precursors useful in making the above described water-soluble isocyanate-terminated prepolymers are the hydrophilic polyols, e.g., "Carbowax" (commercially available from Union Carbide, Danbury, CT). Blends of prepolymers, including various amounts of poly(oxyethylene-oxypropylene) polyols, or hydrophilic polyols with heteric oxyethylene-oxypropylene chains, are also envisioned.

In order to provide better crosslinking of the prepolymers in formation of the gel, the preferred prepolymers have greater than two isocyanate functionalities per molecule. Most preferably, the prepolymer comprises three polyether branches from a central triol moiety. Alternatively, crosslinking may be facilitated by using polyfunctional terminal moieties on the ends of the polyether backbone, or crosslinking agents such as trimethylol propane may be incorporated in the prepolymer composition. The use of polyisocyanates having on average more than two isocyanate functionalities will also provide a good gel matrix formation.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also useable. Other useable polyisocyanate compounds which can be used are other isomers of tolylene diisocyanate, hexamethylene-1,6-diisocyanate, diphenyl-methane-2,4'-diisocyanate diphenyl-methane-4,4'-diisocyanate, m- or p-phenylene diisocyanate and 1,5-naphthalene diisocyanate, or blends thereof. Polymeric polyisocyanates can also be used, such as polymethylene polyphenyl polyisocyanates. Examples of commercially available polymeric polyisocyanates include Mondur ™ MRS, MRS-2 and MRS-10 from Mobay Chemical Co., Pittsburgh, PA. A list of useful commercially available polyisocyanates is found in *Encyclopedia of Chemical Technology* by Kirk and Othmer, 2nd. Ed., Vol. 12, pages 46, 47, Interscience Pub. (1967). Most preferably, the isocyanate has low volatility to reduce the concerns of harm to application personnel through inhalation.

The polyurethane prepolymers of the present invention are liquids or greasy or pasty solids at room temperature. They are reactive in the presence of water to form a cross-linked, water-insoluble, water-containing gelatinous mass having a high degree of elasticity. Reaction times to convert the prepolymer to the gel in the presence of water may be on the order of less than a minute to several hours.

Additional filler materials may be added to the sealing composition of the present invention to provide a more shrink-resistant, cured sealing composition with a higher compression strength. For this purpose, any of a number of filler compositions have been found to be particularly effective. Useful fillers include water-insoluble particulate filler material having a particle size of about less than 500 microns, preferably 1 to 50 microns and a specific gravity in the range of 0.1 to 4.0, preferably 1.0 to 3.0. The filler content of the cured sealing composition of the present invention may be as much as 60 parts filler per 100 parts by weight cured sealing composition, preferably 5 parts to 20 parts per 100.

A preferred method of reinforcing the polyurethane gel is to mix the prepolymer with an aqueous polymeric latex such as described in U.S. Pat. No. 4,315,703. In this embodiment, a filler is incorporated into the ultimate polyurethane gel through the water component of the gel. Other additive ingredients may be included in the sealing composition of the present invention, or may be added to the water at the time of application of the gel. For example, fungicides may be added to prolong the life of the gel and to prevent attack by various fungi. Other active ingredients may be added for various purposes, such as substances to prevent encroachment of plant roots, and the like. Care should be exercised in choosing fillers and other additives to avoid any materials which will have a deleterious effect on the viscosity, reaction time, and the stability of the gel being prepared.

The addition of a base as a catalyst, e.g., tertiary amine catalyst, 2,4,6-tridimethyl aminomethylphenol, 1,4-diazabicyclo (2,2,2)-octane, triethylamine or other amines and metal compound catalysts known in the urethane art, reduces the cure time at ambient sewer temperatures (typical ambient sewer temperatures are about 10° C.). The tertiary amines are typically added to the water used as a coreactant, or may be added to the prepolymer composition. In either case, the tertiary amines are usually present in amounts of about 0.1 to 1.0 percent by weight of prepolymer. The basic catalyst, used in small amounts, results in improved cure rates without detracting from the physical properties of cured foam.

The invention is further illustrated by the following nonlimiting examples. All prepolymer compositions were prepared using Prepolymer A in various solvents and concentrations as shown.

Prepolymer A

Benzoyl chloride (about 0.058% by weight of the ultimate composition) was blended at room temperature under nitrogen with 1 equivalent of an approximately 5000 M.W. polyether triol ("Poly G 83-34," a copolymer of ethylene oxide and propylene oxide commercially available from Olin Corp.). Thereafter, 2.35 equivalents of an 80:20 mixture of 2,4-toluene diisocyanate: 2,6-toluene diisocyanate (Mondur ™ TD-80, commercially available from Mobay Corp.) was rapidly added to the resultant mixture with aggressive agitation. The mixture was maintained at 80–85° C. until the reaction was determined to be complete by titration.

TABLE 1

| Comparison of Water-Immiscible Solvents in Chemical Grout (30% Prepolymer A Content) | | | |
|---|---|---|---|
| Solvent | Viscosity Before Gelling | Gel Time | Comments |
| 1. "DE Acetate"[1] (water miscible) | 80 cps | 110 sec | Good firm gel, semi-clear. Good mixing with water. |
| 2. "PM Acetate"[2] | — | 108 | Good firm gel, semi-opaque. Poor mixing with water. |
| 3. "Super High Flash Naphtha"[3] | — | 38 | Good firm gel, milky white, opaque. Good mixing with water. |
| 4. "Amsco-Solv G"[4] | 50 | 37 | Good firm gel, milky white, opaque. Good mixing with water. |
| 5. 50/50 Blend of "DE Acetate" and "Amsco-Solv G" | — | 45 | Good firm gel, milky white, opaque. Good mixing with water. |
| 6. 75/25 Blend of "DE Acetate" and "Amsco-Solv G" | — | 52 | Good firm gel, milky white, opaque. Good mixing with water. |
| 7. "Exxate 900"[5] | 72 | 34 | Good firm gel, milky white, opaque. Good |

TABLE 1-continued

Comparison of Water-Immiscible Solvents in Chemical Grout (30% Prepolymer A Content)

| Solvent | Viscosity Before Gelling | Gel Time | Comments |
|---|---|---|---|
| 8. "Exxate 1000"[5] | 88 | 34 | mixing with water. Good firm gel, milky white, opaque. Good mixing with water. |

Notes:
[1]"Ektasolve DE Acetate" is diethylene glycol monoethyl ether acetate from Eastman Chemical Co.
[2]"Ucar PM Acetate" is propylene glycol monomethyl ether acetate from Union Carbide (solubility in water = 5.6%).
[3]Amsco Super High Flash Naphtha is an aromatic hydrocarbon solvent from Unocal Chemicals (solubility in water "negligible").
[4]"Amsco-Solv G" is an aromatic hydrocarbon solvent from Unocal Chemicals (solubility in water "negligible").
[5]"Exxate 900" and "1000" are C9 and C10 acetate esters from Exxon Chemical Co. (water-immiscible)

TABLE 2

Low Volatility Solvents

| PLASTICIZER | PREPOLYMER CONTENT (%) | VISCOSITY BEFORE GELLING | GEL TIME[1] | COMMENTS |
|---|---|---|---|---|
| 1. Monsanto HB-40[2] | 30% | 680 cps | 34 sec. | good gel, good mixing with water |
| 2. HB-40 | 25% | 300 | 36 | good gel, good mixing with water |
| 3. HB-40 | 20% | 137 | 45 | good gel, softer, good mixing with water |
| 4. Mesamoll[3] | 30% | 545 | 90 | grainy, oily gel, poor mixing with water |
| 5. Santicizer 160[4] | 30% | — | 73 | grainy, oily gel, poor mixing with water |
| 6. Santicizer 261[5] | 30% | — | 85 | grainy, oily gel, poor mixing with water |
| 7. 50% HB-40 50% Mesamoll | 30% | 400 | 72 | grainy, oily gel, poor mixing with water |
| 8. 50% HB-40 50% Santicizer 160 | 30% | 360 | 243 | soft, grainy, oily gel, poor mixing with water |

Notes:
[1]Gel time of 1:1 by volume mix of prepolymer solution with distilled water.
[2]HB-40 is a partially hydrogenated terphenyl from Monsanto Co.
[3]Mesamoll Plasticizer is an alkyl sulphonic ester of phenol, from Mobay Chemical Co.
[4]Santicizer 160 is butyl benzyl phthalate, from Monsanto Co.
[5]Santicizer 261 is an alkyl benzyl phthalate from Monsanto Co.

TABLE 3

EVALUATION OF PREPOLYMER A IN AMSCO-SOLV G

| FORMULATION | VISCOSITY BEFORE GELLING | GEL TIME | COMMENTS |
|---|---|---|---|
| 1. 30% solids | 50 cps | 37 sec. | Good gel |
| 2. 25% solids | 40 | 35 sec. | Good gel |
| 3. 20% solids | 30 | 38 sec. | Good gel |
| 4. 15% solids | 20 | 50 sec. | Good gel |
| 5. 30% solids + 2% Niax A-99[1] | — | >3 min. | Cured to a soft gel overnight |
| 6. 30% solids + 1% Niax A-99 | — | 26 sec. | Good gel |
| 7. 30% solids + 0.5% Niax A-99 | — | 25 sec. | Good gel |
| 8. 30% solids + 3% triethanolamine[2] | — | 30 sec. | Good gel |
| 9. 30% solids + 6% triethanolamine | — | 30 sec. | Good gel |

Notes:
[1]Niax A-99 is a tertiary amine catalyst from Union Carbide. Added to water.
[2]Triethanolamine was added to water.

TABLE 4

EXPANSION AFTER CURE OF SEVERAL GROUT PROTOTYPES BASED ON PREPOLYMER A

| Solvent | Urethane Content | Expansion |
|---|---|---|
| 1. "AMSCO-SOLV G"[1] | 30% | 13.7% |
| 2. "AMSCO-SOLV G" | 25 | 12.2 |
| 3. "AMSCO-SOLV G" | 20 | 13.3 |
| 4. "AMSCO-SOLV G" | 15 | 7.1 |
| 5. "EXXATE 900"[2] | 30 | 5.5 |
| 6. "EXXATE 1000" | 30 | 5.6 |
| 7. "HB-40"[3] | 30 | 25.3 |
| 8. "HB-40" | 25 | 11.9 |
| 9. "HB-40" | 20 | 10.9 |
| 10. "MESAMOLL"[4] | 30 | 26.4 |

[1]an aromatic hydrocarbon solvent commercially available from Unocal Corp., Schaumberg, IL.
[2]a C9 acetate commercially available from Exxon Corp., Houston, TX.
[3]a C10 acetate commercially available from Exxon Corp., Houston, TX.
[4]an alkylsulfonic acid ester of phenol commercially available from Mobay Chemical Co., Pittsburgh, PA.

Although all the solvents listed in Table 1 were compatible with the prepolymer and yielded clear, low viscosity solutions, the non-polar solvents gave the fastest cure rates.

Similar results are reported in Table 2, where the relatively non-polar HB-40 plasticizer yielded faster gel times and better, less oily gels than the phthalates. Prepolmer solutions comprising HB-40 plasticizer, however, are hazy and require agitiation to obtain uniformity.

Table 3 shows that acceptable 1:1 gels can be obtained at urethane prepolymer contents down to 15%. At 15%, however, the gel time begins to lengthen. The effect of addition of tertiary amine catalysts to shorten the gel time is also reported in this table. Note that addition of an excess amount of catalyst (#5) results in poor gel formation. In this sample, bubbles were evolved which suggested that carbon dioxide was being evolved as part of the reaction of isocyanate with water to form an amine. Apparently, the amine was not reacting with isocyanate as fast as it was being formed, resulting in a poor gel.

The cure expansion data in Table 4 indicates that solvents of both high and low volatility yield compositions that form gel grouts within the desired expansion ranges.

I claim:

1. A sealing composition comprising a water-immiscible organic solvent or water-immiscible solvent blend and a water-soluble, polyurethane prepolymer having terminal isocyanate groups formed by reacting
   (i) a polyether compound having at least two terminal active hydrogen groups and a number average molecular weight between about 3,000 and 20,000 and having random ethylene oxide units and higher alkylene oxide units in a mole ratio of ethylene oxide units to higher alkylene oxide units of at least about 1:1, wherein said higher alkylene oxide units comprise three or more carbon atoms, and
   (ii) sufficient organic polyisocyanate compound having at least two terminal isocyanate groups to provide an NCO: active hydrogen ratio of about 5:1 to about 1.05:1;
said composition having a prepolymer solids content of greater than about 10 and less than about 50 percent prepolymer in the water-immiscible organic solvent or water-immiscible solvent blend.

2. The composition of claim 1, wherein said, higher alkylene oxide units in the polyether compound are selected from a group consisting of propylene oxide, butylene oxide, pentylene oxide, hexylene oxide, and mixtures thereof.

3. The composition of claim 1, wherein the active hydrogen groups are hydroxyl groups.

4. The composition of claim 1, wherein the active hydrogen groups are primary or secondary amine groups.

5. The composition of claim 1, wherein the composition has a concentration of between about 20 and 40 percent prepolymer solids in the water-immiscible organic solvent or water-immiscible solvent blend.

6. The composition of claim 1, wherein said water-immiscible organic solvent or water-immiscible solvent blend has a vapor pressure at 20° C. of less than about 10 mm Hg.

7. The composition of claim 1, wherein the water-immiscible organic solvent or water-immiscible solvent blend has a vapor pressure at 20° C. of less than about 3 mm Hg.

8. The composition of claim 1, wherein the water-immiscible organic solvent or water-immiscible solvent blend will form a separate phase when mixed with water at less than a 1:10 solvent/water ratio.

9. The composition of claim 1, wherein the water-immiscible organic solvent or water-immiscible solvent blend will form a separate phase when mixed with water at less than a 1:100 solvent/water ratio.

10. The composition of claim 1, wherein the water-immiscible organic solvent is selected from the group consisting of water-immiscible esters, water-immiscible ketones, water-immiscible aldehydes, water-immiscible ether esters, water-immiscible aromatic hydrocarbons, water-immiscible halohydrocarbons, water-immiscible glycol ether esters, water-immiscible phthalate plasticisers and other water-immiscible plasticisers.

11. The composition of claim 1, wherein the water-immiscible organic solvent is selected from the group consisting of ethyl acetate, isopropyl acetate, n-propyl acetate, isobutyl acetate, n-butyl acetate, isobutyl isobutyrate, 2-ethylhexyl acetate, ethylene glycol diacetate, C9 acetate, C10 acetate, methyl ethyl ketone, methyl isobutyl ketone, methyl isoamyl ketone, methyl n-amyl ketone, diisobutyl ketone, cyclohexanone, isophorone, acetaldehyde, n-butyraldehyde, crotonaldehyde, 2-ethylhexaldehyde, isobutylaldehyde, propionaldehyde, ethyl 3-ethoxypropionate, toluene, xylene, 1,1,1 trichloroethane, propylene glycol monomethyl ether acetate, ethylene glycol monoethyl ether acetate, ethylene glycol monobutyl ether acetate, diethylene glycol monobutyl ether acetate, dibutyl phthalate, diethyl phthalate, dimethyl phthalate, dioctyl phthalate, dioctyl terephthalate, butyl octyl phthalate, butyl benzyl phthalate, dioctyl adipate, triethylene glycol di-2-ethylhexanoate, trioctyl trimellitate, glyceryl triacetate, glyceryl/tripropionin and 2,2,4-trimethyl-1,3-pentanediol diisobutyrate.

12. A method of sealing a water containing structure to prevent or minimize leakage which comprises mixing the composition of claim 1 with water in the ratio of about 1:1 and injecting the mixture under pressure at the locus of the leakage.

* * * * *

UNITED STATES PATENT AND TRADEMARK OFFICE
CERTIFICATE OF CORRECTION

PATENT NO. : 5,102,938
DATED : April 7, 1992
INVENTOR(S) : Gary P. Roberts

It is certified that error appears in the above-identified patent and that said Letters Patent is hereby corrected as shown below:

Col. 5, line 4, "C9acetate" should be --C9 acetate--.

Col. 5, line 13, "propionaldehyde:" should be --propionaldehyde;--.

Col. 5, lines 21/22, "Ektasolv®" should be --Ektasolve®--.

Col. 5, line 27, "Ektasolv®" should be --Ektasolve®--.

Col. 6, line 40 "Jeffamine®" should be --Jeffamines®--.

Col. 7, line 27, "Technologyby" should be --Technology by--.

Signed and Sealed this

Seventh Day of September, 1993

Attest:

Attesting Officer

BRUCE LEHMAN

Commissioner of Patents and Trademarks